B. W. FJELLMAN.
BUSHING FOR BELT PULLEYS AND THE LIKE.
APPLICATION FILED MAY 13, 1919.

1,370,639.

Patented Mar. 8, 1921.

Inventor
Bengt Wiktor Fjellman
By his Attorneys,
Fraser, Turk & Myers

UNITED STATES PATENT OFFICE.

BENGT WIKTOR FJELLMAN, OF GOTTENBORG, SWEDEN, ASSIGNOR TO AKTIEBOLAGET SVENSKA KULLAGERFABRIKEN, OF GOTTENBORG, SWEDEN, A CORPORATION OF SWEDEN.

BUSHING FOR BELT-PULLEYS AND THE LIKE.

1,370,639.  Specification of Letters Patent.  Patented Mar. 8, 1921.

Application filed May 13, 1919. Serial No. 296,928.

*To all whom it may concern:*

Be it known that I, BENGT WIKTOR FJELLMAN, a subject of the King of Sweden, residing at Gottenborg, Sweden, have invented new and useful Improvements in Bushings for Belt-Pulleys and the like, of which the following is a specification.

In order that belt pulleys and similar machine units may be mounted on shafts the diameter of which is less than the diameter of the bore of hub of the pulleys it has been customary to provide bushings between the shaft and the hub, such bushings being usually formed as rings or annular segments. Such bushings as hitherto constructed have either equal thickness in their whole length or consist of rings having a comparatively large cross sectional area and joined by intermediate parts having reduced thickness.

This invention has for its object to provide an improved bushing of the said last-mentioned kind, said bushing being capable of yielding to a certain extent, thereby enabling a better attachment upon the shaft as compared with bushings of well known construction. Another object of the invention is to provide a bushing of the said kind whereby saving of material in the manufacturing of the bushing is obtained. To this end the parts connecting the rings are formed according to this invention as axial bars the peripheral extension of which is so small as not to prevent the bending of the rings nor the fitting thereof to the shaft when the pulley or the like is fixed upon the shaft.

Figure 1:
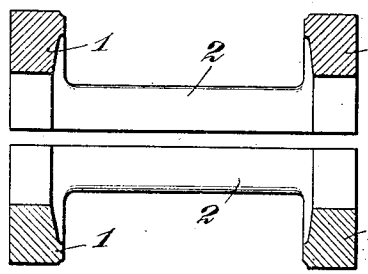
Figure 2:
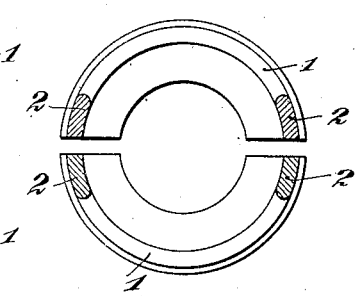
Figure 3:
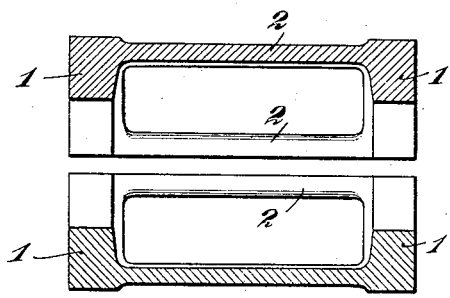
Figure 4:
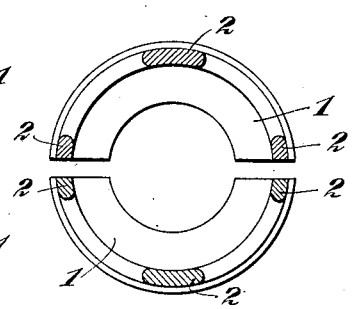
Figure 5:
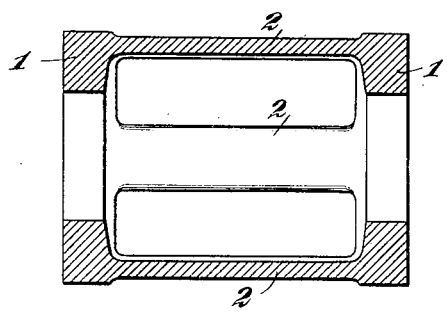
Figure 6:
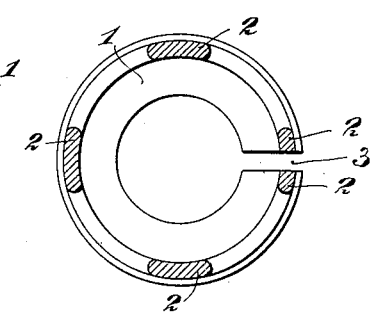

In the accompanying drawing three embodiments of the invention are illustrated. Figures 1 and 2 show a longitudinal section and a cross section, respectively, of a bushing made in two pieces, each piece being formed with two axial bars. Figs. 3 and 4 show a longitudinal section and a cross section, respectively, of a bushing made in two pieces, each piece being formed with three axial bars. Figs. 5 and 6 show a longitudinal section and a cross section, respectively, of a split bushing having four bars.

The bushing shown in Figs. 1 and 2, consists of two similar halves and each of these halves in turn consists of two semi-annular end sections 1 the outer and inner diameters of which correspond to the distance between the shaft and the hub of the pulley for which the bushing is adapted to be used. The semi-annular sections 1 are formed with comparatively small axial dimensions and are connected by means of axial ribs or bars 2 having relatively small peripheral dimensions and a reduced thickness. Each of said bushing halves is formed with two such bars situated one at each of the joints. By this arrangement, the bushing halves may yield to a certain extent when the same are clamped upon the shaft by the pressure exerted by the hub of the divided pulley when the latter is mounted on the shaft. After the mounting of the pulley, the semi-annular sections 1 will, thus, exert a certain outwardly directed pressure on the hub, thereby rigidly securing the latter to the bushing and by means of the latter to the shaft.

In the embodiment shown in Figs. 3 and 4, the bushing likewise consists of two similar halves each of said halves being, however, formed with three axial bars 2, viz. one at each of the joints and the remaining midway between said first mentioned bars. The bars situated at the said joints may be formed with considerably reduced peripheral dimensions as compared with the embodiment shown in Figs. 1 and 2.

The bushing shown in Figs. 5 and 6, consists of two rings 1 split at one side only and connected by four axial bars 2. The slot 3 (Fig. 6) is taken through one of said bars.

It is to be noted that further embodiments than those above described may be made without departing from the principle or the scope of the invention. For instance, any suitable number of connecting bars may be used, and the only condition that must be fulfilled is that the connection between the annular end flanges does not prevent the bending of the said flanges. For obtaining said purpose it is of importance that the connecting bars are formed with such radial dimensions as not to touch the hub, nor the shaft, that is, the radius of the outer surface of said bars should be less than the radius of the outer surface of the annular flanges, while the radius of the inner surface of the bars should be greater than the radius of the inner surface of the said flanges (see Figs. 2, 4 and 6).

Having now particularly described and ascertained the nature of my said invention and in what manner the same is to be performed, I declare that what I claim is:—

A split bushing for pulleys, consisting of solid annular portions at opposite ends, adapted to make bearing contact with the shaft and with the interior of the end portions of the pulley hub, and reduced intervening portions divided axially to form narrow yielding connecting bars, integral with the annular portions, whereby the latter alone carry the pulley and the connecting bars are adapted to yield as the pulley is tightened on the bushing.

In testimony whereof I have signed my name.

BENGT WIKTOR FJELLMAN.